United States Patent
Tremblay et al.

(10) Patent No.: US 10,377,507 B2
(45) Date of Patent: Aug. 13, 2019

(54) MULTIFUNCTIONAL MOTORIZED BOX AND LANDING PAD FOR AUTOMATIC DRONE PACKAGE DELIVERY

(71) Applicants: Simon Tremblay, Quebec (CA); Eric Bharucha, Quebec (CA)

(72) Inventors: Simon Tremblay, Quebec (CA); Eric Bharucha, Quebec (CA)

(*) Notice: Subject to any disclaimer, the term of this patent is extended or adjusted under 35 U.S.C. 154(b) by 21 days.

(21) Appl. No.: 15/179,998

(22) Filed: Jun. 11, 2016

(65) Prior Publication Data
US 2017/0073085 A1    Mar. 16, 2017

(30) Foreign Application Priority Data
Jul. 23, 2015   (CA) .................................... 2898304

(51) Int. Cl.
| | |
|---|---|
| B64F 1/20 | (2006.01) |
| B64F 1/32 | (2006.01) |
| B64F 1/12 | (2006.01) |
| B64F 1/22 | (2006.01) |
| G08G 5/00 | (2006.01) |
| G08G 5/02 | (2006.01) |
| B64F 1/36 | (2017.01) |
| B65D 81/18 | (2006.01) |
| G06Q 10/08 | (2012.01) |
| B64F 1/00 | (2006.01) |

(Continued)

(52) U.S. Cl.
CPC .............. *B64F 1/32* (2013.01); *A47G 29/141* (2013.01); *B64F 1/007* (2013.01); *B64F 1/12* (2013.01); *B64F 1/125* (2013.01); *B64F 1/20* (2013.01); *B64F 1/222* (2013.01); *B64F 1/362* (2013.01); *B65D 81/18* (2013.01); *G06Q 10/0833* (2013.01); *G08G 5/0026* (2013.01); *G08G 5/0069* (2013.01); *G08G 5/025* (2013.01); *B64C 39/024* (2013.01); *B64C 2201/128* (2013.01); *B64C 2201/201* (2013.01)

(58) Field of Classification Search
CPC .. B64F 1/007; B64F 1/125; B64F 1/20; B64F 1/222; B64F 1/32; B64F 1/362; B64C 2201/201; B64C 2201/128
See application file for complete search history.

(56) References Cited

U.S. PATENT DOCUMENTS

| 3,438,489 A | 4/1969 | Cambornac et al. |
|---|---|---|
| 4,255,911 A | 3/1981 | Beacom et al. |

(Continued)

FOREIGN PATENT DOCUMENTS

| CA | 2839581 A1 | 12/2012 |
|---|---|---|
| CN | 203294311 U | 11/2013 |

(Continued)

*Primary Examiner* — Richard R. Green
(74) *Attorney, Agent, or Firm* — Price Heneveld LLP

(57) ABSTRACT

The invention consists of an actuated box and navigation aid for automatic delivery by unmanned vehicles (UAV) or drones. It also incorporates delivery information via the web linking orders, enclosure status, package specific drone homing signals, delivery confirmations and more.

This system incorporates a novel and effective means for providing a standardized and predicable area for safe landing during delivery by functionalized drones. It also secures the package from theft, vandalism, animals and the weather and provides features necessary for air-traffic management.

26 Claims, 4 Drawing Sheets

(51) Int. Cl.
  *A47G 29/14*    (2006.01)
  *B64C 39/02*    (2006.01)

(56) References Cited

U.S. PATENT DOCUMENTS

| | | | |
|---|---|---|---|
| 8,424,802 B2* | 4/2013 | Tripier-Larivaud | B64F 1/007 |
| | | | 244/114 R |
| 8,511,606 B1* | 8/2013 | Lutke | B64C 39/024 |
| | | | 244/100 R |
| 9,384,668 B2 | 7/2016 | Raptopoulos et al. | |
| 9,387,928 B1 | 7/2016 | Gentry et al. | |
| 9,650,133 B2* | 5/2017 | Fisher | B64F 1/005 |
| 9,977,117 B2* | 5/2018 | Parker | G01S 7/414 |
| 2001/0007335 A1 | 7/2001 | Tuttle et al. | |
| 2010/0200694 A1 | 8/2010 | Tripier-Larivaud | |
| 2011/0121734 A1* | 5/2011 | Pape | B64F 1/20 |
| | | | 315/86 |
| 2013/0134260 A1* | 5/2013 | Besenzoni | B64F 1/007 |
| | | | 244/110 E |
| 2014/0024999 A1 | 1/2014 | Levien et al. | |
| 2014/0032034 A1 | 1/2014 | Raptopoulos et al. | |
| 2014/0067160 A1 | 3/2014 | Levien et al. | |
| 2014/0254896 A1 | 9/2014 | Zhou et al. | |
| 2016/0159496 A1* | 6/2016 | O'Toole | B64F 1/32 |
| | | | 244/110 E |
| 2017/0039510 A1 | 2/2017 | Ogilvie et al. | |
| 2017/0144776 A1* | 5/2017 | Fisher | B64F 1/222 |
| 2017/0158353 A1* | 6/2017 | Schmick | B64F 1/007 |
| 2017/0178071 A1 | 6/2017 | Ogilvie et al. | |

FOREIGN PATENT DOCUMENTS

| | | |
|---|---|---|
| DE | 202014000236 U1 | 3/2014 |
| WO | 2014080389 A2 | 5/2014 |
| WO | 2015103411 A1 | 7/2015 |

\* cited by examiner

MULTIFUNCTIONAL MOTORIZED BOX AND LANDING PAD FOR AUTOMATIC DRONE PACKAGE DELIVERY

TECHNICAL FIELD OF THE INVENTION

The present document relates to systems providing a standardized landing zone for an autonomous and/or remotely piloted unmanned aircraft vehicle (UAV) as well as securing the delivered package in an efficient means. It is also suggested a method for necessary regulation of drone traffic by managing emergency situations (unexpected low battery, requests to land due to mechanical problems or bad weather) and monitoring the current air traffic.

BACKGROUND

The economic sector of package delivery has undergone steady growth since the birth of online commerce. People increasingly rely on punctual delivery for urgent orders which leads to increased ground delivery. In cities where the majority of the world population now lives, there is the prospect of a new delivery means. Given that high population density in these urban areas leads to shorter delivery distance: the use of drone delivery is desirable and makes sense economically. The paradigm applies to consumer goods ranging from daily necessities, take-out and medical supplies for example.

It will be also desirable that the goods to be delivered are as near as possible to the customer such that the drone is not blocked from ground level traffic constraints and because the drone has limited cargo lift capability when compared to ground truck delivery. The drone is thus better suited for point-to-point delivery of small packages.

To achieve this, the drone delivery operation must comply with the following requirements:

- A landing pad that is predicable in size and clear from any object
- Provides a means for the drone to remain above ground which is less prone to accidents with animals, children, people and other moving objects.
- The landing area is not buried in snow, sand, ash or other debris that can be blown by winds.
- Allows operation in areas with frost, snow or rain and high temperature.
- Provides theft security and neighbor discretion about a package arrival when used in private home settings.
- Provides a way of keeping the delivered product in a controlled environment, especially when food, medicine or perishable goods are delivered. The system protects the received package from the elements and optionally controls the enclosure's internal temperature, the holding conditions being compatible with the order's optimal storage properties.
- All this is autonomous in operation.
- Provides electrical power to the drone, allowing it to charge its on-board batteries and thus increase its accessible range.

In a broader view, allowing simultaneously multiple drone flights in an area that requires some control features needed by aviation control agencies:

- Provide a safe landing zone with possible recharge in situations when the drone cannot maintain the established flight plan.
- Allow a means of managing and monitoring air traffic to avoid collisions and ensuring that air traffic safety rules are followed.
- Detecting the use of unidentified/unlicensed drones and having a means of tracking down the operator by law enforcement.

BRIEF SUMMARY OF THE INVENTION

In accordance with a first general aspect, there is provided a multifunctional motorized box and landing pad for automatic drone package delivery using an unmanned aircraft vehicle. The multifunctional motorized box and landing pad comprises a box housing defining an enclosure and having a top edge; retractable flaps configurable between a closed configuration and an open configuration; and a motorized mechanism configured to move the retractable flaps between the closed configuration and the open configuration. Each one of the retractable flaps has a landing pad surface and includes an inner flap section and an outer flap section. The retractable flaps are connected to the box housing at the top edge thereof. In the closed configuration, the outer flap sections of the retractable flaps define a protective cover closing the enclosure of the box housing and the inner flap sections of the retractable flaps extend in the enclosure, with the landing pad surface of each one of the retractable flaps facing inwardly towards the enclosure. In the open configuration, the inner flap sections and the outer flap sections of the retractable flaps together define a landing pad for the unmanned aircraft vehicle, with the inner flap sections closing the enclosure of the box housing and the landing pad surface of each one of the retractable flaps facing outwardly for receiving the unmanned aircraft vehicle thereon.

In accordance with another general aspect, there is provided a multifunctional motorized box and landing pad for automatic drone package delivery using an unmanned aircraft vehicle. The multifunctional motorized box and landing pad comprises: a box housing defining an enclosure and having a top edge; retractable flaps including an inner flap section and an outer flap section and connected to the box housing at the top edge thereof, the retractable flaps being configurable between a closed configuration and an open configuration; a motorized mechanism configured to move the retractable flaps between the closed configuration and the open configuration; and a final destination honing system. In the closed configuration, the outer flap sections of the retractable flaps define a protective cover closing the enclosure of the box housing and the inner flap sections of the retractable flaps extend in the enclosure. In the open configuration, the inner flap sections and the outer flap sections of the retractable flaps extend substantially along a common plane to define a landing pad for the unmanned aircraft vehicle, with the inner flap sections closing the enclosure of the box housing. The final destination honing system is in communication with the unmanned aircraft vehicle and is configured to assist in the landing and approach of the unmanned aircraft vehicle towards the multifunctional motorized box and landing pad.

In an embodiment, the final indication honing system comprises luminous indicators providing optical guides for the unmanned aircraft vehicle, the luminous indicators producing pulsed light representative of a binary signal.

In accordance with another general aspect, there is also provided a multifunctional motorized box and landing pad for automatic drone package delivery using an unmanned aircraft vehicle. The multifunctional motorized box and landing pad comprises: a box housing defining an enclosure and having a top edge; retractable flaps connected to the box housing at the top edge thereof, the retractable flaps being configurable between a closed configuration and an open configuration; a motorized mechanism configured to move the retractable flaps between the closed configuration and the open configuration; and a mechanism operative to remove at least one of snow and dust from a surface of the retractable flaps. In the closed configuration, the retractable flaps define a protective cover closing the enclosure of the box housing. In the open configuration, the retractable flaps define a landing pad for the unmanned aircraft vehicle.

In accordance with another general aspect, there is further provided a multifunctional motorized box and landing pad for automatic drone package delivery using an unmanned aircraft vehicle. The multifunctional motorized box and landing pad is in data communication with a remote processing unit and comprises a RF spectrum analyzer scanning a surrounding of the multifunctional motorized box and landing pad to monitor a corresponding airspace. The RF spectrum analyzer identifies RF identifiers of identified unmanned aircraft vehicle and defines a RF power spectrum of the corresponding airspace. The RF identifiers of identified unmanned aircraft vehicle and the RF power spectrum of the corresponding airspace define RF spectrum data that can be used to identify unauthorized unmanned aircraft vehicles. The multifunctional motorized box and landing also comprises a data communication system at least periodically transmitting the RF spectrum data to the remote processing unit over a network.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which.

DETAILED DESCRIPTION

In the following description, the same numerical references refer to similar elements. The embodiments, geometrical configurations, materials mentioned and/or dimensions shown in the figures or described in the present description are embodiments only, given solely for exemplification purposes.

Moreover, although the embodiments of the multifunctional motorized box and landing pad and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the multifunctional motorized box and landing pad, as will be briefly explained herein and as can be easily inferred herefrom by a person skilled in the art. Moreover, it will be appreciated that positional descriptions such as "above", "below", "left", "right" and the like should, unless otherwise indicated, be taken in the context of the figures and should not be considered limiting.

Figure 1:
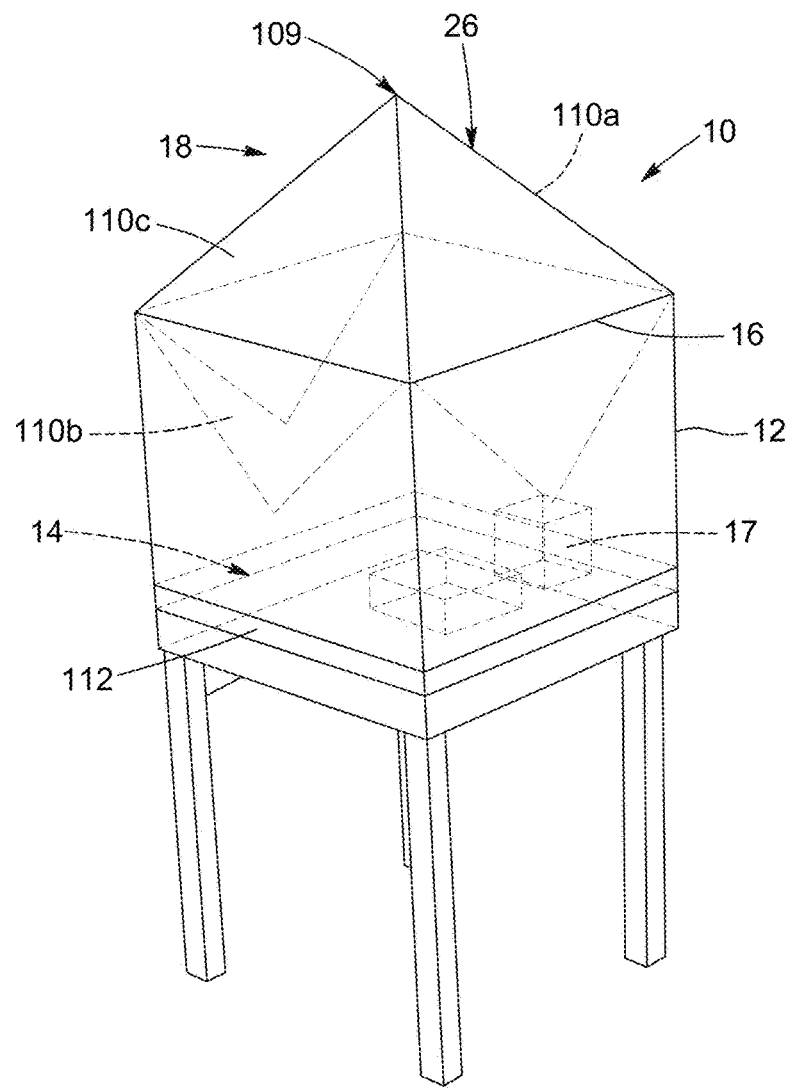
FIG. 1 is a perspective view of the multifunctional motorized box and landing pad, in accordance with an embodiment and where retractable flaps of the motorized box and landing pad are configured in a closed configuration, a box housing of the multifunctional motorized box and landing pad being shown in transparency.
Figure 2:
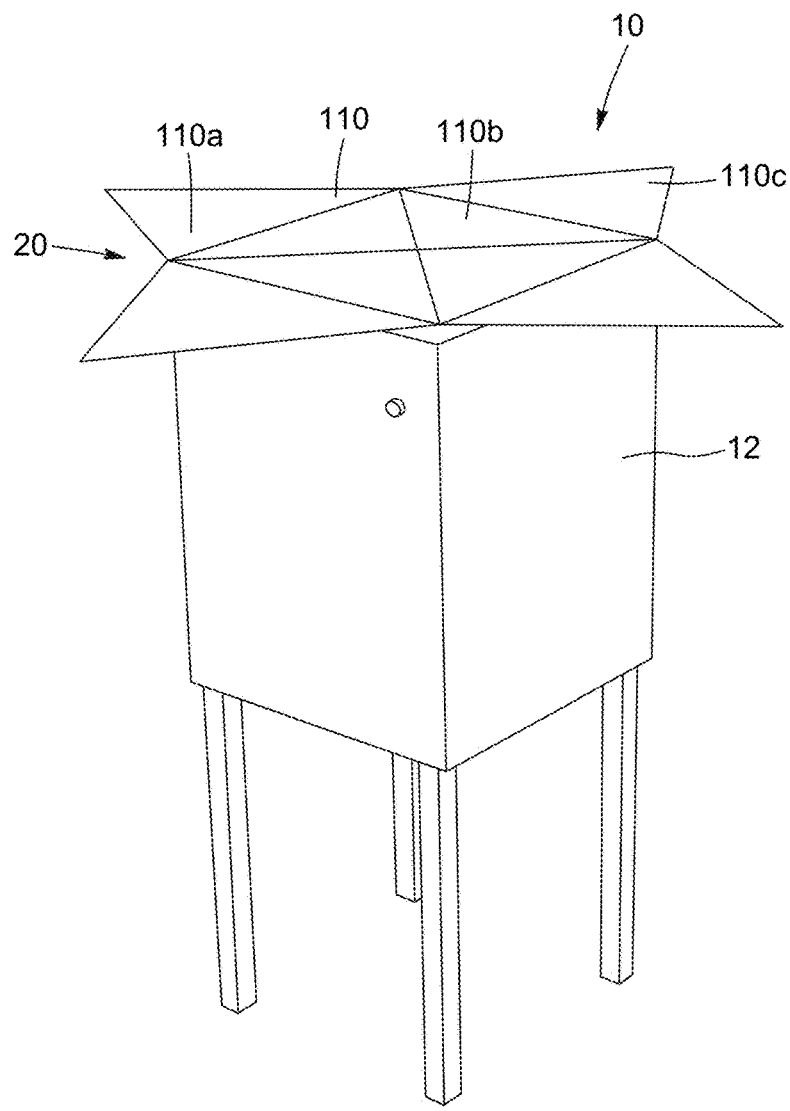
FIG. 2 is a perspective view of the multifunctional motorized box and landing pad of FIG. 1, where the retractable flaps of the motorized box and landing pad are configured in an open configuration.
Figure 3:
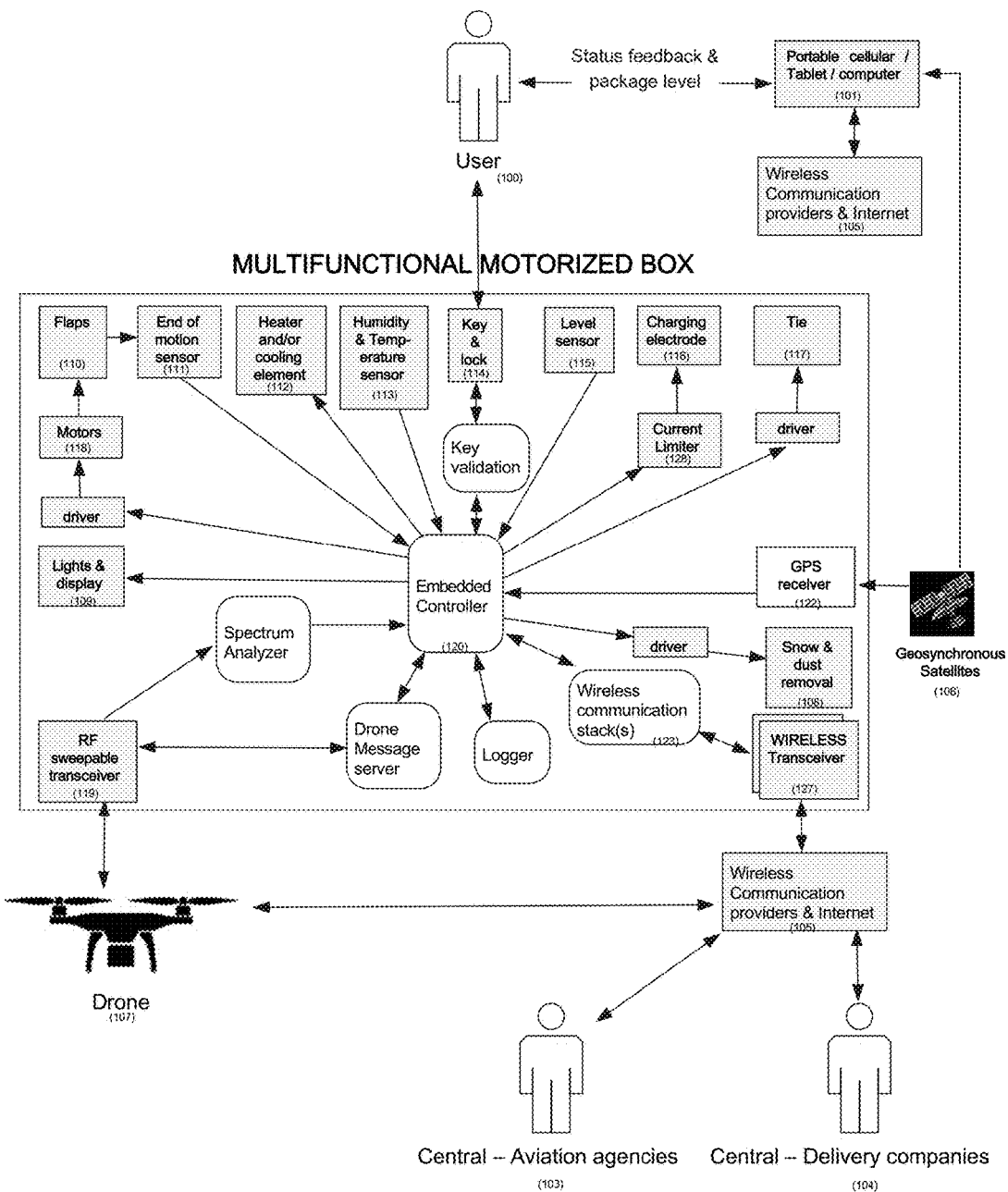
FIG. 3 is a schematic representation of a functional system overview of the multifunctional motorized box and landing pad, in accordance with an embodiment.

Referring to FIGS. 1 to 3, there is shown the multifunctional motorized box and landing pad (or landing box) (10) in accordance with an embodiment (see FIGS. 1 and 2) and a functional system overview of the system including the multifunctional motorized box and landing pad (10) (see FIG. 3). The multifunctional motorized box and landing pad (10) comprises a box housing (12) defining an enclosure (14) and having a top edge (16). The multifunctional motorized box and landing pad (10) also includes retractable flaps (110) configurable between a closed configuration (See FIG. 1) and an open configuration (see FIG. 2). As can be seen in FIGS. 1 and 2, each retractable flap (110) includes an inner flap section (110b) and an outer flap section (110c). In the closed configuration (see FIG. 1), the outer flap sections (110c) of the retractable flaps (110) define a protective cover closing the enclosure (14) of the box housing (12) and the inner flap sections (110b) of the retractable flaps (110) extend in the enclosure (14). In the open configuration (see FIG. 2), the inner flap sections (110b) and the outer flap sections (110c) of the retractable flaps together define a landing pad (20), with the inner flap sections (110b) closing the enclosure (14) of the box housing (12). In other words, in the open configuration (see FIG. 2), the inner flap sections (110b) and the outer flap sections (110c) of the retractable flaps (110) extend substantially along a common plane to define a landing pad (20) for the unmanned aircraft vehicle, with the inner flap sections (110b) closing the enclosure (14) of the box housing (12).

Each one of the retractable flaps (110) has a landing pad surface (110a) and is pivotally connected to the box housing (12) at the top edge (16) thereof. In the closed configuration, the retractable flaps (110) define a protective cover (18) closing the enclosure (14) of the box housing (12), with the landing pad surface (110a) of each one of the retractable flaps (110) facing inwardly towards the enclosure (14). In the open configuration, the retractable flaps (110) define a landing pad (20) for the unmanned aircraft vehicle (or drone) (107), with the landing pad surface (110a) of each one of the retractable flaps (110) facing outwardly for receiving the drone (107) thereon. In an embodiment, the box (10) includes a weatherproof gasket (26) extending along the edges of the retractable flaps (110).

Prior to usage, the customer (100) first registers his system with delivery companies (104). The customer (100) can register his landing box (10) with its ID along and its GPS coordinates acquired via a cellular phone, a tablet or a computer (101) or via the embedded GPS receiver if equipped (106 & 122). The customer (100) can then connect the box (10) to a standard power source. The box (10) has posts for yard installation (see FIG. 1) and anchors for balcony use. Standardized clearances must be respected. The box (10) may itself communicate to the delivery company this information when enabled for internet access through the user's private wireless communication (WiFi, cellular or other) (105, 126 & 127).

The box (10) has retractable flaps (110) that serve a dual function of protective cover when closed (see FIG. 1) and a landing pad when opened (see FIG. 2). To achieve this, when closed, some parts of the flaps (i.e. the landing pad surface (110a)) face downward in the box (10). Many embodiments of the flaps (110) are possible. Depending on the mechanical flap configuration, an optional, extensible material can be used between flaps (110) to provide a continuous sealed area when deployed (i.e. when configured in the open configuration).

A motorized mechanism (111 & 118) is responsible of moving the flaps (110) from open to close state (or configuration) and is commanded by an embedded electronics or computer (to move the flaps (110) from the closed state of FIG. 1 to the open state of FIG. 2). Such mechanisms can be either centralized in the box (10) or can be independent for each flap.

In an embodiment, each flap (110), on the landing pad surface (110a), has one or many non-corrosive electrodes (116) that link safely to an in-drone battery charger. The drone (107) could use non-corrosive conductive landing gear to make contact. The spacing and placement between electrode groups is constructed in a manner that allows at least two different polarity/phase contacts for any drone landing position for a standardized landing pad distance. Electrodes can have many forms, dots, line mesh or continuous surfaces and may be spring loaded. Charge can be enabled upon drone request ('CHARGES'). Alternately charging may be via an inductive link.

The current limited source (128) can be DC or AC with two or more electrical phases for allowing in-drone charging. This allows charging even if only two electrodes make contact (116). If more than two make contact, the greater the current may be delivered by unit of time. The current limiter (128) may also incorporate a ground fault detector to prevent electric shock to users or bystanders.

Optionally, each landing gear of the drone (107) may have a coil, a magnet or a ferromagnetic material. In an embodiment, a coil or magnet is placed in various locations in the flap for allowing firm contact while charging and magnetically ties (117) the drone to the landing pad to prevent a fall from high winds or an impact. The magnetic tie down system can also be used by the drone upon landing and started upon its command by a drone message (TIE). Alternately mechanically actuated anchoring may be used.

In an embodiment, lights (109) are placed on the edges of the flaps (110) and/or in the box (10) and serve as an optical guide for the drone (107) to make the final landing approach, thus providing a final destination honing system allowing efficient night time operation with the drone camera. The final destination honing system is in communication with the drone (107) and is configured to assist in the landing and approach of the drone 107 towards the box (10). In an embodiment, the luminous indicators (109) are positioned on the landing pad surface of the retractable flaps (110). Optionally, some of these luminous indicators (109) may be placed inside the box (10) and their covering parts on the flaps (110) shall then be made transparent allowing light to flow out.

In an embodiment, the lights (109) may be pulsed by the controller (121) in a binary manner which allows for the drone (107) via simple optical sensor or camera use to capture the box's ID and status. Color changes may also be utilized as to enhance guidance or as communications. Non-visible light (infrared or UV) may also be used instead or in addition to visible light.

In an embodiment, depending on the system communication and availability, the box is able to exchange communication messages either directly by a RF transceiver (119 & 124) or by a wireless communication & internet (105, 126 & 127).

Complimentarily, in an embodiment, the box may have a RF transceiver (119) that can transmit a message stack (124) continuously in addition to a periodical ID and status. The status is used to assist the drone's (107) navigation while searching for the box (10) and making a landing approach. The said transceiver (119) may be composed of directional antennas to further enhance navigation.

In an embodiment, the box may also be fitted with a multiplicity of wireless transceivers (127) (RF, WiFi, cellular or other) that can exchange messages with the drone using internet, cellular or another common global network.

Referring to FIGS. 1 to 4, to allow a box open for landing, the box (10) receives the message key or token from the drone (107). This key may be encrypted. If the matching key is provided, then the flaps (110) open and the box status changes from 'IDLE' to 'OPENING' and the status is broadcasted to the drone (107). When opened completely, the box (10) then broadcasts a 'READY' state indicating to the drone (107) that the pad (20) is available for landing. For enhanced security, the computer might detect that all the flaps (110) are correctly deployed in the landing pad configuration by the means of one or many sensors.

In the case that the wrong key has been given to the box, a message is broadcasted along with visual light indications informing the drone (107) that the wrong box has been selected. This allows the drone (107) to move on to a different target.

Once the drone (107) has landed, the package (17) is deposited and the drone (107) clears the pad, the drone (107) sends a "Done" message to the box (10). The controller (121) then changes its status to 'CLOSING'. When the flaps (110) close, the package (17) falls to the bottom or onto the previous package inside the box (10) (i.e. in the enclosure (14)). When completed, it broadcasts the delivery status in the 'NOTIFY' state, then returns to the 'IDLE' state.

Optionally and if authorized in user settings, the box (10) may accept an opening request and provide a recharge service to an in-transit drone that needs power, using the previous stated procedure but using a RF universal "Emergency" or "Charge message" pass key. Box ID & Drone ID & status are updated via the drone's communication link. Depending of the delivery system software configuration, the user may be credited for this event. Also, the user may deny this. In that situation, the box will reply a denied message following such a drone request.

The drone relays information to delivery company's central computing system (104) which informs both parties on the delivery status.

A level sensor detects (115) the current package level inside the box.

As previously mentioned, the box (10) can be linked to the internet via WiFi or other wireless means (105, 126 & 127). Access to the cloud allows real-time delivery tracking, system ID, status, box fill level and delivery tracking information. The system operates independently despite network connection being unavailable.

In an embodiment, a temperature sensor and optionally a humidity sensor (113) detects frost conditions and starts a periodic or programmed defrost heating cycle to prevent mechanical failure of the box opening system. In other words, the box includes a defrost mechanism performing a defrost cycle of at least a section of the box (10) upon detection of frost conditions by the temperature sensor and/or a humidity sensor (113).

In an embodiment, a temperature sensor (113) with a heating or cooling element (112) is also used to keep the interior of the box (10) (or the box enclosure 14) at a required temperature until the box is emptied.

In an embodiment, the required temperature and the control duration limit are sent by the delivery companies (104) via the drone (107) or the wireless communication (105) when delivering the package (17).

In an embodiment, the box has an electronic and/or mechanical key (114 & 123) allowing opening of the box (10) for package retrieval. All accesses made are logged by the device (125); more than one user may have access.

In an embodiment, mechanisms for the removal or melting of snow and dust (or snow/dust removal mechanism) (108) may be optionally integrated in the form of compressed air jet or heating elements integrated into the surface (i.e. into the retractable flaps to clean a surface thereof).

In an embodiment, the box may have a display for showing the user current package level and status.

In an embodiment, the RF drone's ID and RF power spectrum may serve to regulate air traffic in a centralized manner. The box could be equipped with wide band RF spectrum analyzer/scanner (119 & 120) that can report to aviation regulation agency (103) the RF power spectrum surrounding the box and also all standard drone ID and RF power data through a local WiFi or wireless connection (105, 126 & 127). The agency then has access to all boxes data from different spatial locations, thus allowing triangulations of both identified (by ID) and unidentified (by RF spectrum usage) drone signature and positions. This allows real-time monitoring and possible signature requests from an agency's command center. Also, real-time and historical positioning data that can be used by law enforcement in the case of an illegal usage of drones.

Figure 4:
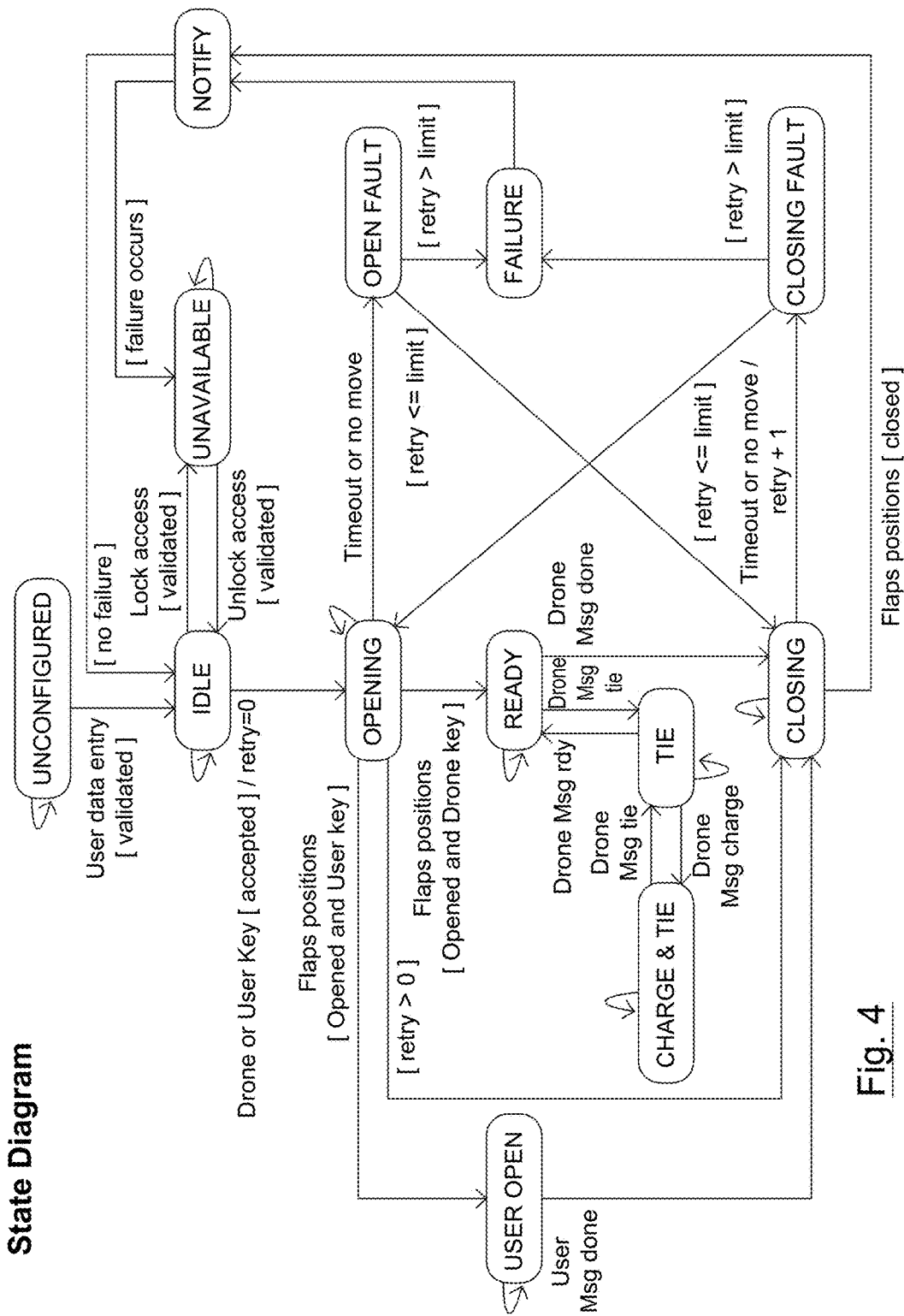
FIG. 4 is a state diagram of the multifunctional motorized box and landing pad, in accordance with an embodiment.

A more complete box behavior is depicted using the state diagrams in FIG. 4. The box is initially delivered in an 'UNCONFIGURED' state as it waits for data user (100) inputs from a computer, cellular or tablet (101) via the wireless link (105) (GPS position confirmation, customer ID, preferences, etc.). When the information is received and accepted by the delivery company (104), the box is set to an 'IDLE' using similar means. For all status broadcasts the box ID and status are sent via local RF (119), the same information along with the local RF spectrum are sent (126) via the wireless network (127) when available. In the 'IDLE' state only, the box listens for a drone message (Drone key) or a user input (User key). Upon reception of a valid key, it goes into the 'OPENING' state and checks flaps movement progression. When flaps are confirmed to be fully extended, the status progresses to 'READY' (if it was triggered by a drone) or to 'USER OPEN' (if triggered by a user key). In the 'READY' state, the drone is assisted by the box in its final approach by both lights (109) and by RF signals (119). Once it has landed, or prior to arrival, the drone may request the states TIE (117) then 'CHARGE' (116). The drone may leave the package and when it has taken off it sends a "Done" message which makes the box go into the 'CLOSING' state. If any error occurs during the 'OPENING' or 'CLOSING' states, the box retries then it enters a 'FAILURE' status if it cannot complete. The 'NOTIFY' state sends a message to both delivery company (104) and user (100) about the delivery and the box status. If a 'FAILURE' state occurs the box is set to the 'UNAVAILABLE' state rather than 'IDLE'. The user can toggle between those two states (UNAVAILABLE', 'IDLE') from a user key (114) or from a computer, cellular or tablet (101) using the wireless link (105).

What is claimed is:

1. A multifunctional motorized box and landing pad for automatic drone package delivery using an unmanned aircraft vehicle, the multifunctional motorized box and landing pad comprising:
a box housing having a top edge and defining a sealable package receiving enclosure having a closed bottom chamber including a base and at least one side wall projecting upwardly therefrom and an open top defining a package inlet;
retractable flaps each having a landing pad surface and including an inner flap section and an outer flap section, the retractable flaps being connected to the box housing at the top edge thereof and being configurable between a closed configuration wherein the outer flap sections of the retractable flaps define a protective cover covering the package inlet and sealing the package receiving enclosure and the inner flap sections of the retractable flaps extend inside the package receiving enclosure, with the landing pad surface of each one of the retractable flaps facing inwardly towards the package receiving enclosure, and an open configuration wherein the inner flap sections and the outer flap sections of the retractable flaps together define a landing pad for the unmanned aircraft vehicle, with the inner flap sections covering the package inlet and closing the package receiving enclosure of the box housing, and the landing pad surface of each one of the retractable flaps facing outwardly for receiving the unmanned aircraft vehicle thereon; and
a motorized mechanism configured to move the retractable flaps between the closed configuration and the open configuration.

2. The multifunctional motorized box and landing pad of claim 1, wherein the inner flap section of the retractable flaps covers the package inlet of the package receiving enclosure at the top edge of the box housing, when the retractable flaps are configured in the open configuration, the inner flap section of the retractable flaps extending substantially along a common plan with the outer flap section of the retractable flaps.

3. The multifunctional motorized box and landing pad of claim 1, wherein the retractable flaps are pivotally connected to the box housing along a single pivot point, the retractable flaps being pivotable about the single pivot point between the closed configuration and the open configuration.

4. The multifunctional motorized box and landing pad of claim 1, wherein the retractable flaps each include a non-corrosive electrode on the landing pad surface thereof, the non-corrosive electrode being connectable to a battery charger of the unmanned aircraft vehicle, when the unmanned aircraft vehicle is supported on the landing pad defined by the retractable flaps configured in the open configuration to charge a battery of the unmanned aircraft vehicle.

5. The multifunctional motorized box and landing pad of claim 1, further comprising an anchoring system allowing anchoring of the unmanned vehicle supported on the landing pad, when the retractable flaps are configured in the open configuration, the anchoring system being one of a mechanical anchoring system and a magnetic anchoring system.

6. The multifunctional motorized box and landing pad of claim 1, further comprising at least one of a heating or a cooling element operative to regulate a temperature inside the enclosure of the box housing.

7. The multifunctional motorized box and landing pad of claim 1, further comprising a defrost mechanism including at least one of a temperature sensor and a humidity sensor, the defrost mechanism performing a defrost cycle of at least a section of the multifunctional motorized box and landing pad upon detection of frost conditions by the at least one of the temperature sensor and the humidity sensor.

8. The multifunctional motorized box and landing pad of claim 1, further comprising:
   a RF spectrum analyzer scanning a surrounding of the multifunctional motorized box and landing pad to monitor a corresponding airspace, the RF spectrum analyzer identifying RF identifiers of identified unmanned aircraft vehicle and defining a RF power spectrum of the corresponding airspace, the RF identifiers of identified unmanned aircraft vehicle and the RF power spectrum of the corresponding airspace defining RF spectrum data that can be used to identify unauthorized unmanned aircraft vehicles; and
   a data communication system at least periodically transmitting the RF spectrum data to a remote processing unit over a network.

9. The multifunctional motorized box and landing pad of claim 1, wherein the motorized mechanism is sized and positioned to move the retractable flaps between the closed configuration and the open configuration without substantially impacting on a clearance of the package inlet.

10. A multifunctional motorized box and landing pad for automatic drone package delivery using an unmanned aircraft vehicle, the multifunctional motorized box and landing pad comprising:
   a box housing having a top edge and defining a sealable package receiving enclosure having a closed bottom chamber including a base and at least one side wall projecting upwardly therefrom and an open top defining a package inlet;
   retractable flaps each including an inner flap section and an outer flap section and connected to the box housing at the top edge thereof, the retractable flaps being configurable between a closed configuration wherein the outer flap sections of the retractable flaps define a protective cover covering the package inlet and sealing the package receiving enclosure of the box housing and the inner flap sections of the retractable flaps extend inside the package receiving enclosure, and an open configuration wherein the inner flap sections and the outer flap sections of the retractable flaps extend substantially along a common plane to define a landing pad for the unmanned aircraft vehicle, with the inner flap sections covering the package inlet and closing the package receiving enclosure of the box housing;
   a motorized mechanism configured to move the retractable flaps between the closed configuration and the open configuration; and
   a final destination honing system in communication with the unmanned aircraft vehicle, the final destination honing system being configured to assist in the landing and approach of the unmanned aircraft vehicle towards the multifunctional motorized box and landing pad and comprising luminous indicators providing optical guides for the unmanned aircraft vehicle, the luminous indicators producing pulsed light representative of a binary signal.

11. The multifunctional motorized box and landing pad of claim 10, wherein the motorized mechanism is sized and positioned to move the retractable flaps between the closed configuration and the open configuration without substantially impacting on a clearance of the package inlet.

12. The multifunctional motorized box and landing pad of claim 10, wherein the luminous indicators are positioned on the landing pad defined by the retractable flaps configured in the open configuration.

13. The multifunctional motorized box and landing pad of claim 10, wherein the inner flap section of the retractable flaps covers the enclosure at the top edge of the box housing, when the retractable flaps are configured in the open configuration, the retractable flaps being pivotable along a single pivot point, between the closed configuration and the open configuration.

14. The multifunctional motorized box and landing pad of claim 10, further comprising at least one of a heating or a cooling element operative to regulate a temperature inside the enclosure of the box housing.

15. The multifunctional motorized box and landing pad of claim 10, further comprising a defrost mechanism including at least one of a temperature sensor and a humidity sensor, the defrost mechanism performing a defrost cycle of at least a section of the multifunctional motorized box and landing pad upon detection of frost conditions by the at least one of the temperature sensor and the humidity sensor.

16. The multifunctional motorized box and landing pad of claim 10, further comprising an anchoring system allowing anchoring of the unmanned vehicle supported on the landing pad, when the retractable flaps are configured in the open configuration, the anchoring system being one of a mechanical anchoring system and a magnetic anchoring system.

17. The multifunctional motorized box and landing pad of claim 10, further comprising:
   a RF spectrum analyzer scanning a surrounding of the multifunctional motorized box and landing pad to monitor a corresponding airspace, the RF spectrum analyzer identifying RF identifiers of identified unmanned aircraft vehicle and defining a RF power spectrum of the corresponding airspace, the RF identifiers of identified unmanned aircraft vehicle and the RF power spectrum of the corresponding airspace defining RF spectrum data that can be used to identify unauthorized unmanned aircraft vehicles; and
   a data communication system at least periodically transmitting the RF spectrum data to a remote processing unit over a network.

18. A multifunctional motorized box and landing pad for automatic drone package delivery using an unmanned aircraft vehicle, the multifunctional motorized box and landing pad comprising:
   a box housing having a top edge and defining a sealable package receiving enclosure having a closed bottom chamber including a base and at least one side wall projecting upwardly therefrom and an open top defining a package inlet;
   retractable flaps connected to the box housing at the top edge thereof, the retractable flaps being configurable between a closed configuration wherein the retractable flaps define a protective cover covering the package inlet and sealing the package receiving enclosure of the box housing, and an open configuration wherein the retractable flaps define a landing pad for the unmanned aircraft vehicle while covering the package inlet and closing the package receiving enclosure of the box housing;
   a motorized mechanism configured to move the retractable flaps between the closed configuration and the open configuration; and
   a mechanism operative to remove at least one of snow and dust from a surface of the retractable flaps.

19. The multifunctional motorized box and landing pad of claim 18, wherein the motorized mechanism is sized and positioned to move the retractable flaps between the closed configuration and the open configuration without substantially impacting on a clearance of the package inlet.

20. The multifunctional motorized box and landing pad of claim 18, wherein the mechanism operative to remove at least one of snow and dust is operative to remove at least one of snow and dust from the landing pad when the retractable flaps are configured in the open configuration.

21. The multifunctional motorized box and landing pad of claim 18, wherein the mechanism operative to remove at least one of snow and dust includes heating elements mounted to the retractable flaps.

22. The multifunctional motorized box and landing pad of claim 18, wherein the mechanism operative to remove at least one of snow and dust includes nozzles projecting an air jet to clean the surface of the retractable flaps.

23. The multifunctional motorized box and landing pad of claim 18, further comprising a defrost mechanism including at least one of a temperature sensor and a humidity sensor, the defrost mechanism performing a defrost cycle of at least a section of the multifunctional motorized box and landing pad upon detection of frost conditions by the at least one of the temperature sensor and the humidity sensor.

24. The multifunctional motorized box and landing pad of claim 18, further comprising an anchoring system allowing anchoring of the unmanned vehicle supported on the landing pad, when the retractable flaps are configured in the open configuration, the anchoring system being one of a mechanical anchoring system and a magnetic anchoring system.

25. The multifunctional motorized box and landing pad of claim 18, further comprising at least one of a heating or a cooling element operative to regulate a temperature inside the enclosure of the box housing.

26. The multifunctional motorized box and landing pad of claim 18, further comprising:
- a RF spectrum analyzer scanning a surrounding of the multifunctional motorized box and landing pad to monitor a corresponding airspace, the RF spectrum analyzer identifying RF identifiers of identified unmanned aircraft vehicle and defining a RF power spectrum of the corresponding airspace, the RF identifiers of identified unmanned aircraft vehicle and the RF power spectrum of the corresponding airspace defining RF spectrum data that can be used to identify unauthorized unmanned aircraft vehicles; and
- a data communication system at least periodically transmitting the RF spectrum data to a remote processing unit over a network.

\* \* \* \* \*